UNITED STATES PATENT OFFICE.

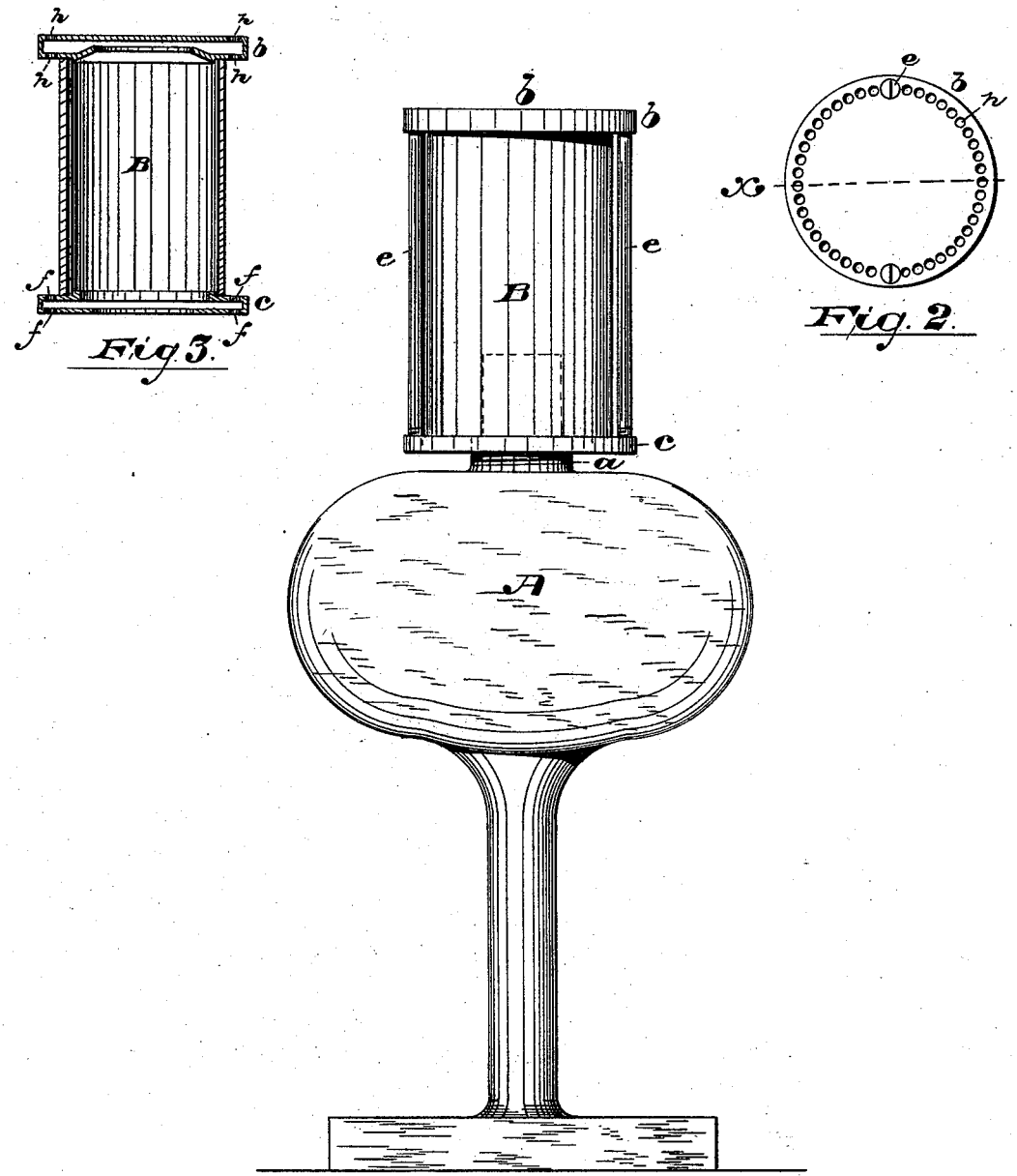

MAHLON S. DRAKE, OF NEWARK, NEW JERSEY.

LAMP.

SPECIFICATION forming part of Letters Patent No. 417,551, dated December 17, 1889.

Application filed February 23, 1888. Serial No. 264,996. (No model.)

*To all whom it may concern:*

Be it known that I, MAHLON S. DRAKE, a citizen of the United States, residing at Newark, in the county of Essex and State of New Jersey, have invented certain new and useful Improvements in Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is the production of a lamp wherein the flame cannot be extinguished by any sudden or rapid movement of the lamp, either vertically or laterally, or from any violent current of air; and my invention consists in supplying the lamp with perforated air-chambers at the top and bottom of the chimney, and also in the various arrangements and combinations of parts, substantially as will be hereinafter set forth, and pointed out in the several clauses of the claim.

Referring to the accompanying drawings, in which like letters of reference indicate corresponding parts in each of the figures thereof, Figure 1 is an elevation of a lamp with my improved chimney attached. Fig. 2 is a top or plan view of the chimney and its attachment. Fig. 3 is a longitudinal sectional view on the line X of Fig. 2, showing upper and lower air-chambers.

In said drawings, A indicates a lamp of ordinary construction; B, a straight cylindrical chimney, at the top and bottom of which are air-chambers $b$ and $c$, with perforated upper and lower walls. $e$ indicates rods for holding the top and bottom air-chambers and chimney firmly together. $a$ represents a threaded stud or portion of a burner, by which the air-chambers and chimney are secured to the body of the lamp, the lower air-chamber $c$ being placed below the flame.

When the burner of my improved lamp is lighted, the air necessary to keep up combustion enters through the holes $f$ in the bottom plate into the lower air-chamber, and thence into the chimney, and after having served its purpose of supplying oxygen to the flame passes into the upper air-chamber $b$, and thence out through the holes $h$ $h$ in the upper plate. Thus a continual supply of fresh air is supplied to the flame, as will be manifest.

Sometimes lamps are so constructed that the part forming the wick-holder is placed in a box, which serves as a flue or chimney. In lamps of this construction the flame is easily extinguished by any sudden movement of the lamp, as the air comes directly in contact with the flame. These objections are obviated by the use of my invention. The perforations in the upper and lower air-chamber being outside of the glass chimney, any sudden draft or gust of air, no matter from what direction, is carried up or down outside of the glass and passes out through the holes on the outside, and thus entirely and completely prevents the extinguishment of the lamp by any such sudden draft or gust of air.

Having thus described the invention, what I claim as new is—

1. In a lamp, the combination, with the burner, of a straight cylindrical chimney, an air-chamber perforated in its upper and lower walls and extending outside said chimney and on which said chimney rests, an air-chamber perforated in its upper and lower walls at the top of said chimney, and rods connecting the upper and lower chambers and holding them in position, substantially as described, and for the purposes set forth.

2. In a lamp, the combination, with the burner, of a chimney for furnishing air for combustion, an annular air-chamber on which the chimney rests, and perforations outside of the chimney in both the upper and lower walls of said air-chamber, opening directly into the outer atmosphere, as described, and for the purposes set forth.

3. In a lamp, a chimney or flue consisting of a cylinder, an air-chamber on which said cylinder rests, an air-chamber at the top of said cylinder, both of said chambers being perforated in their upper and lower walls, and extending outside the cylinder and communicating directly with the outer atmosphere, and means for connecting said air-chambers and holding the cylinder in position, as described, and for the purposes set forth.

In testimony that I claim the foregoing I have hereunto set my hand this 6th day of February, 1888.

MAHLON S. DRAKE.

Witnesses:
OLIVER DRAKE,
E. L. SHERMAN.